United States Patent
Khan et al.

(10) Patent No.: US 10,320,945 B2
(45) Date of Patent: *Jun. 11, 2019

(54) USING DOUBLE BUFFERING FOR SCREEN SHARING

(71) Applicant: Microsoft Technology Licensing, LLC, Redmond, WA (US)

(72) Inventors: Nayab Khan, Kenmore, WA (US); Meng Lin, Issaquah, WA (US); Toji T. Oommen, Sammamish, WA (US); Jaydeep Singh, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

This patent is subject to a terminal disclaimer.

(21) Appl. No.: 15/201,752

(22) Filed: Jul. 5, 2016

(65) Prior Publication Data

US 2017/0006137 A1 Jan. 5, 2017

Related U.S. Application Data

(63) Continuation of application No. 12/773,025, filed on May 4, 2010, now Pat. No. 9,407,724.

(51) Int. Cl.
*G06F 15/173* (2006.01)
*H04L 29/06* (2006.01)

(52) U.S. Cl.
CPC .......... *H04L 67/38* (2013.01); *H04L 65/4007* (2013.01); *G09G 2350/00* (2013.01); *G09G 2370/022* (2013.01); *H04L 67/42* (2013.01)

(58) Field of Classification Search
CPC ..... H04N 7/15; G06F 3/1454; H04L 12/1822; G09G 2350/00; G09G 2370/022
(Continued)

(56) References Cited

U.S. PATENT DOCUMENTS

| | | | |
|---|---|---|---|
| 5,956,729 | A | 9/1999 | Goetz et al. |
| 6,782,542 | B1 | 8/2004 | Mein et al. |

(Continued)

OTHER PUBLICATIONS

"Inter-Tel Web Conferencing and Remote Support User Guide", In Inter-Tel Web Conferencing/Remote Support User Guide, Issue 4.5, released by Inter-Tel®, Inc., Jun. 2006, 88 Pages.
(Continued)

*Primary Examiner* — Phuoc H Nguyen
(74) *Attorney, Agent, or Firm* — Liang IP, PLLC

(57) ABSTRACT

Remote desktop sharing allows a user to access applications and data on a remote computer over a network. An intermediary computer can communicate with a host computer and one or more client computers to facilitate remote desktop sharing. The host can send the intermediary computer an encoded key frame and encoded updates. The intermediary computer can decode the host screen data, and apply subsequent updates to the decoded image so that the intermediary computer has a near live host screen image in a first buffer. A second buffer on the intermediary computer can store an instance of a screen encoder for each client computer that has joined the session and the most current host image that the client computer has. The encoder compares the near live screen image and the stored client computer host image to create an encoded differential screen image update to pass to the client computer.

20 Claims, 6 Drawing Sheets

(58) Field of Classification Search
USPC .................................. 709/204, 203, 231, 242
See application file for complete search history.

(56) References Cited

U.S. PATENT DOCUMENTS

| | | | |
|---|---|---|---|
| 7,293,243 | B1 | 11/2007 | Ben-Shachar et al. |
| 7,451,181 | B2 | 11/2008 | Sasaki et al. |
| 7,546,353 | B2 | 6/2009 | Hesselink et al. |
| 7,595,798 | B2 | 9/2009 | Ben-Shachar et al. |
| 9,143,570 | B2 | 9/2015 | Khan et al. |
| 2003/0085923 | A1 | 5/2003 | Chen et al. |
| 2006/0136828 | A1 | 6/2006 | Asano |
| 2006/0195495 | A1 | 8/2006 | Asano |
| 2008/0095151 | A1 | 4/2008 | Kawazoe et al. |
| 2009/0172512 | A1 | 7/2009 | Sakaguchi et al. |
| 2011/0134120 | A1 | 6/2011 | Antonyuk et al. |
| 2011/0173256 | A1* | 7/2011 | Khalatian ............... G06F 3/038 709/203 |
| 2011/0276619 | A1 | 11/2011 | Khan et al. |

OTHER PUBLICATIONS

"Mac Server Series: Connect With Screen Sharing", Retrieved from <<http://www.farawaymac.com/mac-server/mac-server-series-connect-with-screen-sharing/>>, Retrieved Date : Mar. 3, 2010, 4 Pages.

"ScreenStream Screen Broadcasting Software", Retrieved from <<http://www.nchsoftware.com/screen/index.html>>, Retrieved Date: Mar. 4, 2010, 1 Page.

"Xuggle Screensharing Notes", Retrieved from <<https://web.archive.org/web/20100313144544/http://wiki.xuggle.com/Xuggle_Screensharing_Notes>>, Retrieved Date: Mar. 3, 2010, 3 Pages.

"Final Office Action Issued in U.S. Appl. No. 12/773,025", dated Jun. 6, 2013, 28 Pages.

"Final Office Action Issued in U.S. Appl. No. 12/773,025", dated Jun. 3, 2015, 31 Pages.

"Non Final Office Action Issued in U.S. Appl. No. 12/773,025", dated Jan. 26, 2015, 31 Pages.

"Non Final Office Action Issued in U.S. Appl. No. 12/773,025", dated Jan. 29, 2013, 25 Pages.

"Notice of Allowance Issued in U.S. Appl. No. 12/773,025", dated Apr. 5, 2016, 8 Pages.

"First Office Action Issued in Chinese Patent Application No. 201110125188.9", dated Jan. 6, 2015, 11 pages.

"Notice of Allowance Issued in Chinese Patent Application No. 201110125188.9", dated Feb. 16, 2016, 4 Pages.

"Second Office Action Issued in Chinese Patent Application No. 201110125188.9", dated Sep. 8, 2015, 7 Pages.

Boyaci, et al., "BASS Application Sharing System", In Proceedings of the 2008 Tenth IEEE International Symposium on Multimedia, ISM, Dec. 15, 2008, pp. 432-439.

Humphrey, Randy, "NetMeeting 3.01 Remote Desktop Sharing: Security Concerns", In SANS GIAC Practical Paper, Assignment Version 1.4b Option 1, May 20, 2003, 17 Pages.

Ichimura, et al., "Lightweight Desktop-Sharing System for Web Browsers", In Proceedings of Third International Conference on Information Technology and Applications (ICITA'05), vol. 2, Jul. 4, 2005, 6 Pages.

Wolf, et al., "Multimedia Application Sharing in a Heterogeneous Environment", In Proceedings of the Third ACM International Conference on Multimedia, Nov. 5, 1995, 17 Pages.

\* cited by examiner

USING DOUBLE BUFFERING FOR SCREEN SHARING

CROSS-REFERENCE TO RELATED APPLICATION(S)

This application is a continuation of and claims priority to U.S. patent application Ser. No. 12/773,025, filed on May 4, 2010, the disclosure of which is incorporated herein in its entirety.

BACKGROUND

Remote desktop sharing allows a user to access applications and data on a remote computer over a network. For example, Microsoft® Remote Desktop is a model where one computer "takes control" of a second computer by viewing its desktop session and acting as master for keyboard and mouse input. Similarly, remote meeting software enables a user to meet with other computer users, customers, clients or colleagues via a network such as the Internet in real-time. Networks like the Internet are unpredictable. Heavy traffic on the network can lead to variations in upload and download speeds. Differing network connectivity bandwidth and processing speed of computers connected to the network can also lead to delays in data transmission. Delays in data transmission can result in the client seeing outdated host information.

SUMMARY

In screen sharing, a host computer can connect to an intermediary computer and request the intermediary computer to create a session on the intermediary computer for screen sharing applications with one or more client computers. The host computer can send a current screen image to the intermediary computer. The intermediary computer can store the screen image in a first buffer. One or more client computers can join the session on the intermediary computer. A new instance of a screen encoder can be created on the intermediary computer for each screen sharing client computer in a second buffer. The second buffer can also include the most current version of the host screen image that the client computer has received. The screen encoder uses a near live screen image of the host computer and the contents of the second buffer to create an encoded differential update image data stream to be passed to the client computer.

Because encoding is done on the intermediary computer so that updates are not stored on the intermediary computer, a constant amount of memory can be allocated on the intermediary computer. Because client computer screens are updated using the near live screen image of the host, the amount of bandwidth needed by the client computer can be reduced. Double buffering or a combination of double buffering and maintaining a FIFO (first-in-first-out) queue can be used to implement screen sharing using an intermediary computer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
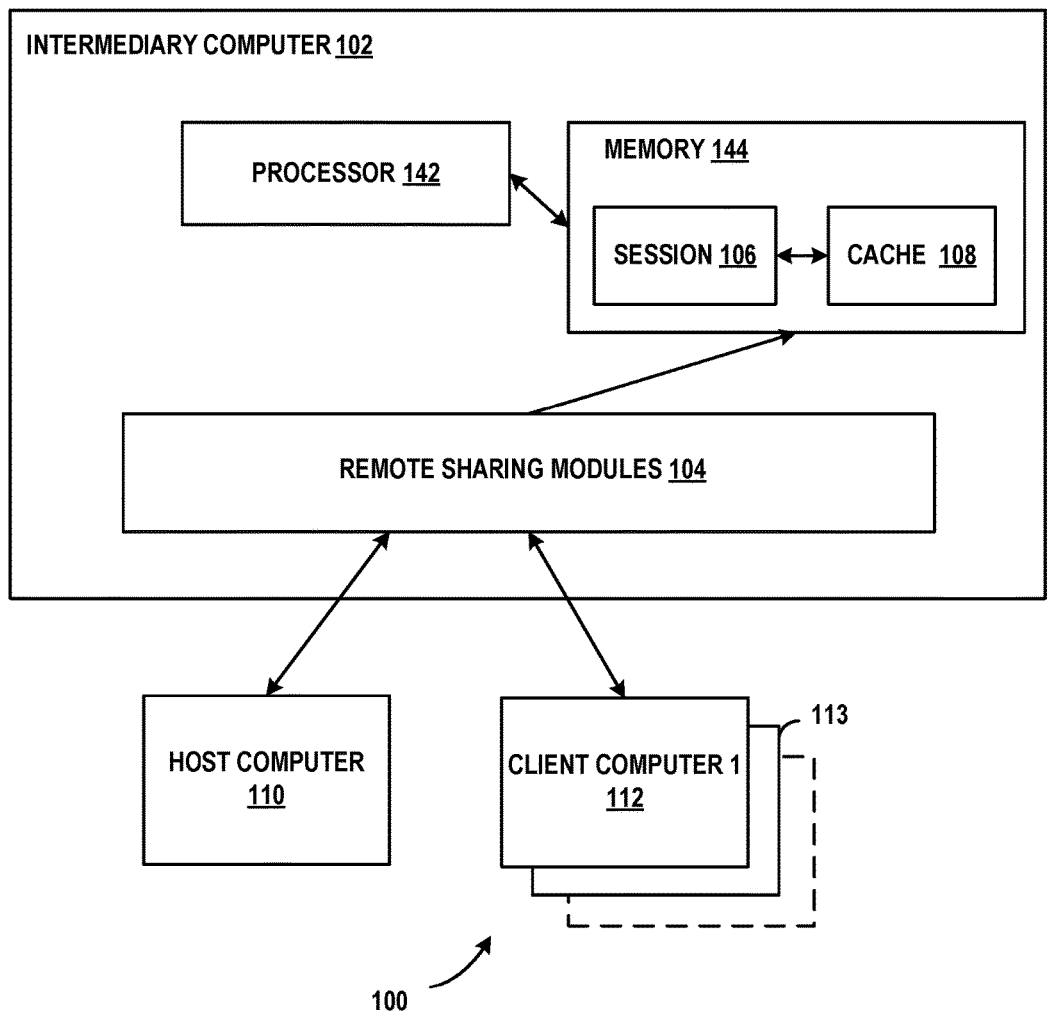
FIG. 1a illustrates an example of a system 100 that implements desktop screen sharing in accordance with aspects of the subject matter disclosed herein.

In screen sharing applications including support and maintenance applications, web conferencing and so on, a user has to share his computer screen with a support engineer, or with colleagues and/or other users. Screen sharing can involve a host computer program running on the user computer (host computer), and a client computer program running on the support engineer's computer or other users' computers (client computers). The host computer and the client computers are connected to a network such as a LAN, WAN or the Internet. The computers typically are protected by one or more firewalls. A firewall secures a computer from attacks from an outside network such as the Internet by blocking inbound connections to the protected computer. A firewall allows access to connections that are outbound, for example, from the protected computer to the Internet.

If the host computer is protected by a firewall, an attempt by the client computer to connect to the host computer will be prevented by the firewall because it is an inbound connection. To overcome this limitation and to bypass network security, establishing a connection between the client computer and the host computer can be accomplished indirectly using a third computer as an intermediary between the client computer and the host computer.

In one approach the host computer first sends a snapshot of its entire screen image. This snapshot is called the key frame. After the initial snapshot is sent, a differential screen encoder subsequently sends only the changed parts of the screen image, which have been encoded. Sending only the changed parts of the screen images in an encoded form typically reduces the memory and bandwidth needed to transmit animated screens. One such encoder is a Titanium encoder by Microsoft Research but there are many encoders known in the art. Thus, changed portions of the screen are encoded by the encoder and are sent to the intermediary computer periodically. The intermediary computer can store the encoded screen image updates in a FIFO (first-in-first-out) queue in memory until a client computer requests an update. The client computer receives the updates in the order in which the server received the updates from the host computer and replays them on the client computer.

While this process can sometimes work well, when the network is slow, computer hardware limitations exist or for other reasons, the flow of the encoded information from the host computer to the client computer can slow down. For example, when the client computer is slower than the host computer, the queue on the intermediary computer may grow in size, exhausting or depleting the memory of the intermediary computer. One possible solution is to slow down the sending of updates from the host computer or to request the host computer to send key frames so that intermediate frames can be discarded. Because a key frame includes the content of the entire screen, a key frame is typically bigger and therefore more resource-expensive to transmit over the network. Thus, sending key frames can also slow down a client computer.

Slowing down the update interval on the host computer may not work as expected if the polling interval is miscalculated or if the speed of the client computer fluctuates. Also, if there are multiple clients with different network speeds and different hardware, all the client computers will be slowed down by the client computer with the slowest speed.

In accordance with aspects of the subject matter disclosed herein, a double buffering approach is described in which a host computer's screen image is recreated on the intermediary computer for the session. When encoded data (e.g., key frame data and screen image update data) is passed to the intermediary computer, the intermediary computer can decode the data into its original format and can store the initial key frame received from the host computer in a buffer in memory and can apply the screen image updates to the stored host screen image. As a result, the server has a "near live" screen image of the host computer at all times.

When a client computer joins the screen sharing session, the intermediary computer can create an instance of a screen encoder for the client computer. The screen encoder and the latest version of the screen image that the client computer has can be stored in a second buffer on the intermediary computer. An instance of a screen encoder can be created on the intermediary computer for each client computer that joins the session and a copy of the latest version of the host screen image can be stored in the second buffer for each client computer. When a client computer requests an update, the encoder compares the near live screen image of the host computer in the first buffer with the last version of the host screen image stored in the second buffer for the client computer to create an encoded screen image update to send to the client computer.

Thus, each client computer can work independently with the intermediary computer, requesting screen updates from the intermediary computer as often or as infrequently as it wants, and at its own speed, without holding up any of the other client computers. Moreover, when a client computer connects to the session, the client computer receives a near real-time image of the host computer instead of an initial key frame and all the updates which have to be transmitted over the network, decoded and the updates replayed on the client computer. The FIFO queue that in other approaches stores screen image updates is unnecessary. The amount of memory on the intermediary computer consumed by each client computer is fixed or constant. It does not grow and shrink with the size of the FIFO queue. The approach described above works well for times when network speed is fluctuating and/or when there are multiple client computers that have different network bandwidth and hardware processing speed capabilities. The delay in showing the host computer screen image on the intermediary computer is reduced to the delay that is caused by network latency.

While the approach described above is typically advantageous when the client computer is slower that the host computer, it is possible that it can consume more resources of the intermediary computer, for example, when all the client computers are faster than the host computer or when the speed of the host computer and client computers match. In such an event, a hybrid approach that uses both the FIFO queue and the double buffering approach can be applied or a dynamic algorithm can drive switching between approaches as described more fully below.

Desktop Screen Sharing Using Double Buffering

FIG. 1a illustrates an example of a system 100 for desktop screen sharing in accordance with aspects of the subject matter disclosed herein. All or portions of system 100 may reside on one or more computers such as the computers described below with respect to FIG. 3. System 100 or portions thereof may be provided as a stand-alone system or as a plug-in or add-in.

The computer on which system 100 executes can be an intermediary computer 102 between a host computer 110 and one or more client computers such as client computer 1 112, client computer 2 113, etc. The intermediary computer 102 can be a web server computer or a proxy server or a gateway. If intermediary computer 102 is a web server, intermediary computer 102 lacks software and lacks hardware that bypasses firewall or shared IP limitations that is present on a proxy server or gateway. Intermediary computer 102 may act as an intermediary to enable one computer to "take control" of a second computer by enabling the first computer (a computer on which a client program is running) to view the desktop session of the second computer (a host computer on which a host program is running) and enable the first computer to act as master for input device input (e.g., keyboard input, mouse input, stylus input, etc.) for the second computer. Intermediary computer 102 can be an intermediary computer for web conferencing or application sharing between a host computer 110 and a plurality of client computers such as client computer 1 112, client computer 2 113, etc.

The intermediary computer 102 can include one or more of: a processor (such as processor 142), a memory 144, and one or more modules for desktop screen sharing 104. Other components well known in the art may also be included but are not here shown. It will be appreciated that one or more modules for desktop screen sharing 104 can be loaded into memory 144 to cause one or more processors such as processor 142 to perform the actions attributed to the one or more modules for desktop screen sharing. System 100 can also include one or more of the following: a screen sharing session 106 and a cache 108.

In accordance with aspects of the subject matter disclosed herein, the host computer 110 can connect to an intermediary computer 102 and request the intermediary computer 102 to create a new session such as screen sharing session 106. If the intermediary computer 102 is a web server, the host computer 110 can connect to the web server and request the web server to create a new session such as screen sharing session 106 using secure (HTTPS) and non-secure (HTTP) communications using an HTTP GET or POST command. The web server can receive the communication from the host computer 110 and in response can establish the requested session (e.g., screen sharing session 106) and can return a session-specific identifier for the session to the host computer 110 via an HTTP GET or POST command.

As the web server may have sessions for a number of different users, a session-specific identifier can provide a mechanism to identify the session for this particular host (and any client computers that may join the session). The host computer 110 can use a codec such as but not limited to a screen codec such as Microsoft® Titanium Codec, an audio codec such as Direct Stream Digital, Free Lossless Audio Codec, etc., a text codec such as BiM, Continuous Media Markup Language, etc., a video codec such as Alpary or Blackbird, or any lossy or lossless codec, whether now known or developed in the future. In accordance with aspects of the subject matter disclosed herein, the codec can be used to send encoded screen images and encoded screen image updates to the intermediary computer 102.

A codec is a device or computer program capable of encoding and/or decoding a digital data stream or signal or other data stream or signal. A codec encodes a data stream or signal for transmission, storage or encryption, or decodes it for playback or editing. Codecs can be used in videoconferencing and streaming media applications. For example, a video camera's analog-to-digital converter (ADC) can convert an analog camera's analog signals into digital signals. The digital signals can then be passed through a video compressor for digital transmission or storage. A receiving device can run the signal through a video decompressor and then through a digital-to-analog converter (DAC) for analog display.

In accordance with aspects of aspects of the subject matter disclosed herein, the host computer 110 can use the codec to post an initial encoded screen image and/or differential encoded screen image updates to the web server using an HTTP GET or POST command. Posting of the images can occur at regular (constant) intervals or at variable intervals. Each screen image update can be time stamped for replay in time sequence on the client computer 1 112. The web server can cache screen image and screen image updates in memory as a first-in-first-out (FIFO) list (e.g., in cache 108). The web server can instruct the host computer 110 to change its screen image update intervals or screen resolution.

One or more clients computers such as client computer 1 112, client computer 2 113, etc. can connect to the web server and request to join the screen sharing session 106 identified by the session-specific identifier using an HTTP GET or POST command. The client computers, client computer 1 112, client computer 2 113, etc., can specify the session-specific identifier of the screen sharing session 106 or session management software as known in the art can manage the session initiation between the host computer 110 and the client computers. The client computers, client computer 1 112, client computer 2 113, etc., can request a latest or current screen image from the web server for the screen sharing session 106 identified by the session-specific identifier ID using an HTTP GET or POST command. The client computers, (e.g., client computer 1 112) can also send any user device input events that originated at the client computer 1 112 to the web server using an HTTP GET or POST command.

The web server can keep track of the screen images and screen image updates that were transferred from web server to the client computers and can send only updated screen image data to the client computers using one or more HTTP GET or POST commands. The screen image data sent to the client computer 1 112 can optionally be sent from storage in the FIFO list cache 108. The web server can send all the updated screen image data as one package or can send the updated screen image data in multiple packages. The screens can be sent as a JSON object or in any other way. The client computer 1 112 can process the screen updates received from the web server. The described process can be continued until the screen sharing session 106 is closed. The described process can be used to allow the client computer 1 112 to take control of the host computer 110 and to enable the client computer 1 112 to act as the master of host computer 110 for keyboard and mouse input. The screen sharing session 106 can be closed by the host computer 110 or by the client computer 1 112 or by the web server 102. The described process can be used to allow a group of computers (e.g., client computer 1 112, client computer 2 113, etc.) to collaborate in a screen sharing or application sharing session such as web conferencing with the host computer 110.

The interval of posting screen updates can be varied by the web server depending on the number of screen update packets in the FIFO list waiting to be sent to the client computers using an HTTP GET or POST command. For example, a client computer that is slower that the host computer may cause the FIFO list in cache 108 to become larger than desired. In response the web server can tell the host computer 110 to slow down its update interval (e.g., increase the time interval between updates). Similarly, if the FIFO list in cache 108 becomes very small, either in size or in number of updates, the web server may tell the host computer 110 to increase the speed of the update interval (i.e., decrease the update interval so that more updates are made within a given time period). A formula that determines update interval can be a linear equation where the length of interval is directly proportional to the size or number of pending items in FIFO list.

Figure 1B:
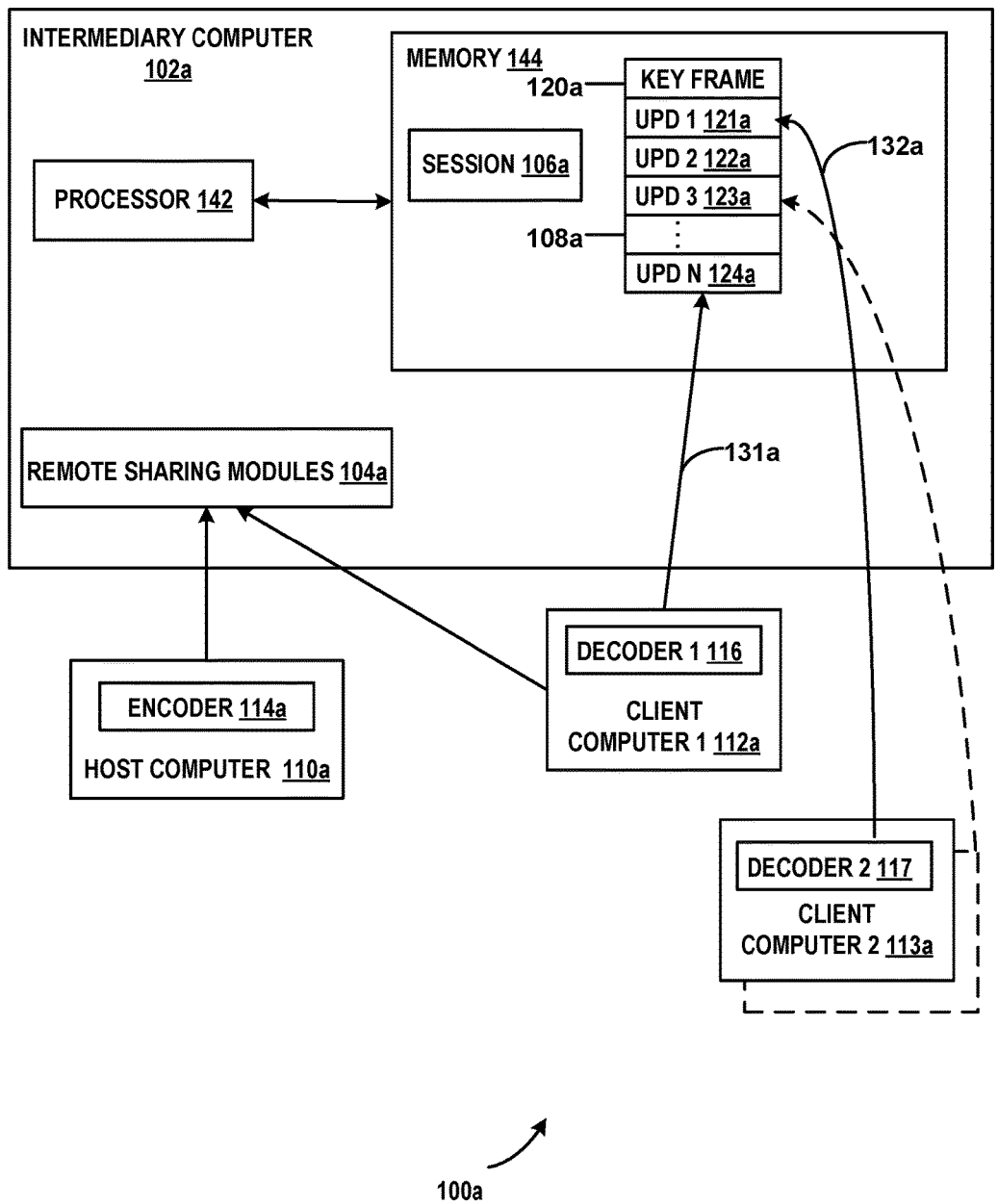
FIG. 1b illustrates an example of a system 100a that implements desktop screen sharing using a FIFO queue in accordance with aspects of the subject matter disclosed herein.

Alternatively, intermediary computer 102 can be a proxy server or gateway and updates can be applied to the client computers as described with respect to FIG. 1b.

FIG. 1b illustrates an example of a system 100a for desktop screen sharing in accordance with aspects of the subject matter disclosed herein. All or portions of system 100a may reside on one or more computers such as the computers described below with respect to FIG. 3. System 100a or portions thereof may be provided as a stand-alone system or as a plug-in or add-in.

The computer on which system 100a executes can be an intermediary computer such as intermediary computer 102a between a host computer 110a and one or more client computers such as client computers 1 112a, client computer 2 113a, etc. The intermediary computer 102a can be a web server computer or a proxy server or a gateway as described above with respect to FIG. 1a.

The intermediary computer 102a can include one or more of: a processor (such as processor 142), a memory such as memory 144, and one or more modules for remote desktop screen sharing using a FIFO queue 104a. Other components well known in the art may also be included but are not here shown. It will be appreciated that one or more modules for remote desktop screen sharing using a FIFO queue 104a can be loaded into memory 144 to cause one or more processors such as processor 142 to perform the actions attributed to one or more modules for remote desktop screen sharing using a FIFO queue 104a. System 100a can also include one or more of the following: a screen sharing session 106a and a cache such as FIFO cache 108a. Host computer 110a may include an encoder 114a to encode data sent to the intermediary computer 102a. Client computers can include a decoder, such as decoder 1 116 on client computer 1 112a and decoder 2 117 on client computer 2 113a to decode encoded data received from intermediary computer 102a.

In accordance with aspects of the subject matter disclosed herein, the host computer 110a can connect to an intermediary computer 102*a* and request the intermediary computer 102*a* to create a new screen sharing session such as screen sharing session 106*a*. In response intermediary computer 102*a* can create a screen sharing session 106*a* and can create a cache such as FIFO cache 108*a*. The host computer 110*a* can first send a snapshot of the host's entire screen called the key frame to the intermediary computer 102*a*.

The intermediary computer 102*a* can store the key frame in FIFO cache 108*a*, e.g., illustrated in FIG. 1*b* by the key frame 120*a* of FIFO cache 108*a*. The key frame can also be retained in the memory of the encoder 114*a* of the host computer 110*a*. Changed portions of the screen can be encoded by the encoder 114*a* and can be sent to the intermediary computer 102*a* periodically. The intermediary computer 102*a* can store the encoded differential screen image updates in the FIFO cache 108*a* in memory until requested by one or more client computers. The encoded differential screen image updates stored in the FIFO cache 108*a* are illustrated in FIG. 1*b* by update 1 121*a*, update 2 122*a*, update 3 123*a*, etc. to update N 124*a*. Although only one session, screen sharing session 106*a*, is illustrated in FIG. 1*b*, it will be appreciated that intermediary computer 102*a*, can establish a number of sessions (not shown) for a number of groups of computers (not shown), assigning session-specific identifiers to different sessions associated with different groups of computers.

A plurality of computers, such as client computer 1 112*a*, client computer 2 113*a*, etc., can request to join the session (e.g., screen sharing session 106*a*) associated with the host computer 110*a*. In response, the intermediary computer 102*a* can send each client computer the initial key frame (key frame 120*a*) followed by the updates in the order in which the intermediary computer 102*a* received the updates from the host computer 110*a*. Thus, at any point in time, each client computer that has joined the screen sharing session 106*a* may have received, decoded and applied a different number of updates, illustrated in FIG. 1*b* by client computer 1 112*a* having a pointer 131*a* to update N 124*a* and client computer 2 113*a* having a pointer 132*a* to update 1 121*a*. Pointers can be maintained by the intermediary computer 102*a* or by the client computers attached to the session.

Figure 1C:
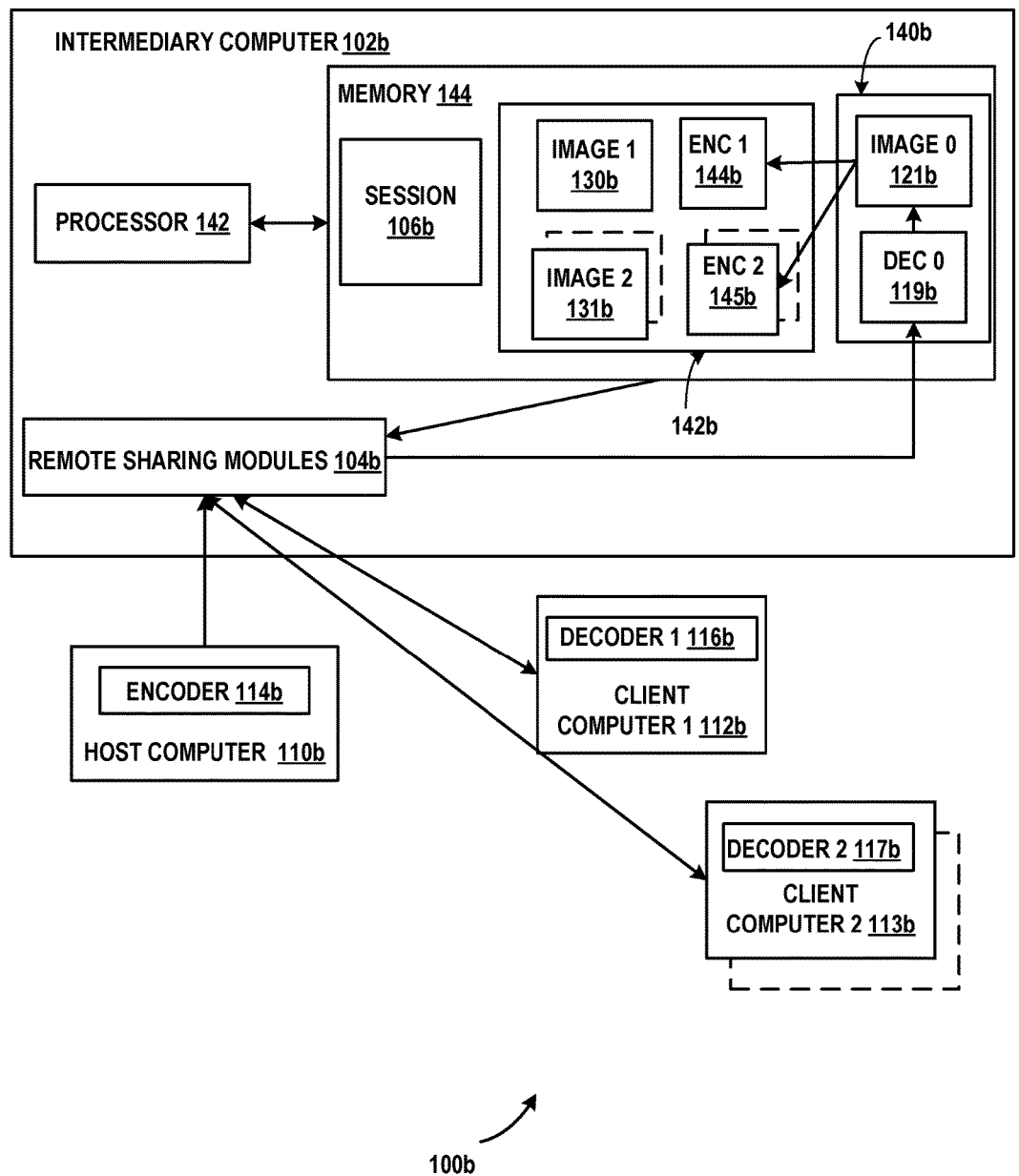
FIG. 1c illustrates an example of a system 100b that implements desktop screen sharing using double buffering in accordance with aspects of the subject matter disclosed herein.

FIG. 1*c* illustrates an example of a system 100*b* for desktop screen sharing using double buffering in accordance with aspects of the subject matter disclosed herein. All or portions of system 100*b* may reside on one or more computers such as the computers described below with respect to FIG. 3. System 100*b* or portions thereof may be provided as a stand-alone system or as a plug-in or add-in.

The computer on which system 100*b* executes can be an intermediary computer 102*b* between a host computer 110*b* and one or more client computers such as client computer 1 112*b*, client computer 2 113*b*, etc. The intermediary computer 102*b* can be a web server computer or a proxy server or a gateway as described above with respect to FIG. 1*a*.

The intermediary computer 102*b* can include one or more of: a processor (such as processor 142), a memory 144, one or more modules for desktop screen sharing using double buffering 104*b*. Other components well known in the art may also be included but are not here shown. It will be appreciated that one or more modules for desktop screen sharing using double buffering 104*b* can be loaded into memory 144 to cause one or more processors such as processor 142 to perform the actions attributed to one or more modules for desktop screen sharing using double buffering 104*b*. System 100*b* can also include one or more of the following: a screen sharing session 106*b* and a first and second buffer represented by buffer 1 140*b* and buffer 2 142*b*. Host computer 110*b* may include an encoder 114*b* to encode data sent to the intermediary computer 102*b*. Client computers can include a decoder, such as decoder 1 116*b* on client computer 1 112*b* and decoder 2 117*b* on client computer 2 113*b* to decode encoded data received from intermediary computer 102*b*.

In accordance with aspects of the subject matter disclosed herein, a double buffering approach is described in which a host computer's screen image is recreated on the intermediary computer 102*b* for the screen sharing session 106*b*. When encoded screen image update data is received by the intermediary computer 102*b*, the intermediary computer 102*b* decodes the update and applies it to the host screen image in memory. As a result, the intermediary computer 102*b* has an image that is very close to the live screen image of the host computer at all times as described more fully below.

In accordance with aspects of the subject matter disclosed herein, the host computer 110*b* can connect to an intermediary computer 102*b* and request the intermediary computer 102*b* to create a new session such as screen sharing session 106*b*. In response intermediary computer 102*b* can create the screen sharing session 106*b* and create a first buffer, e.g., buffer 1 140*b* for storing a recreated current image, e.g., image 0 121*b* for host computer 110*b*. Buffer 1 140*b* can also include a decoder such as decoder 0 119*b* for decoding encoded information received from the host computer 110*b*. For example, the host computer 110*b* can passed encoded data representing a key frame to intermediary computer 102*b*. The intermediary computer 102*b* can decode the encoded data into its original bitmap format using decoder 0 119*b* and store the image, e.g., image 0 121*b*. When encoded data representing an update to the host screen image in memory is received by the intermediary computer 102*b*, the update can be decoded by decoder 0 119*b* and applied to the host screen image in memory (image 0 121*b*) in buffer 140*b*. As a result, the intermediary computer 102*b* has a near live screen image of the host computer.

A second buffer, e.g., buffer 2 142*b* can be created in the memory 144 of intermediary computer 102*b*. An instance of a screen encoder can be created in buffer 2 142*b* on the intermediary computer 102*b* for each client computer that has joined screen sharing screen sharing session 106*b*. For example, encoder 1 144*b* can be created in buffer 2 142*b* on intermediate computer 102*b* for client computer 1 112*b* and encoder 2 145*b*, etc., can be created in buffer 2 142*b* on intermediate computer 102*b* for client computer 2 113*b*, and so on for each client computer that joins screen sharing session 106*b*. The encoders (e.g., encoder 1 144*b*, encoder 2 145*b*, etc.) can use the near live screen image of the host screen, image 121*b* and a copy of the latest version of the host screen image that the client computer has to create an encoded data stream to be passed to the client computers. For example, encoder 1 144*b* can create an encoded differential screen update by comparing image 1 130*b* with image 0 121*b* for client computer 1 112*b* when client computer 1 112*b* connects to the intermediary computer 102*b* and requests an update and can send the encoded differential screen image to client computer 1 112*b*. Image 1 130*b* is then set to image 0 121*b*. Similarly, encoder 2 145*b* can create an encoded differential screen update by comparing image 2 131*b* with image 0 121*b* for client computer 2 113*b* when client computer 2 113*b* connects to the intermediary computer 102*b* and requests an update and can send the encoded differential screen image to client computer 2 113*b*. Image 2 131*b* is then set to image 0 121*b*.

Each client computer connected to the session thus can work independently with the intermediary computer 102*b* at its own speed. As a result, when a client computer connects to the session, the client computer receives a near real-time image of the host computer; each client can request screen updates from the server as often or as infrequently as it wants. A FIFO queue that stores screen image updates on the intermediary computer is unnecessary. The amount of memory used by the first buffer on the intermediary computer is fixed or constant. The amount of memory on the intermediary computer consumed by each client computer is fixed or constant, the total amount of memory on the intermediary computer consumed by all the client computers being proportional to the number of client computers joined to the screen sharing session. The approach described above works well for times when network speed fluctuates and when there are multiple clients that have different network bandwidth and hardware speed. The delay of showing the host screen on the client screen can potentially be reduced to the amount of delay caused by network latencies.

Figure 1D:
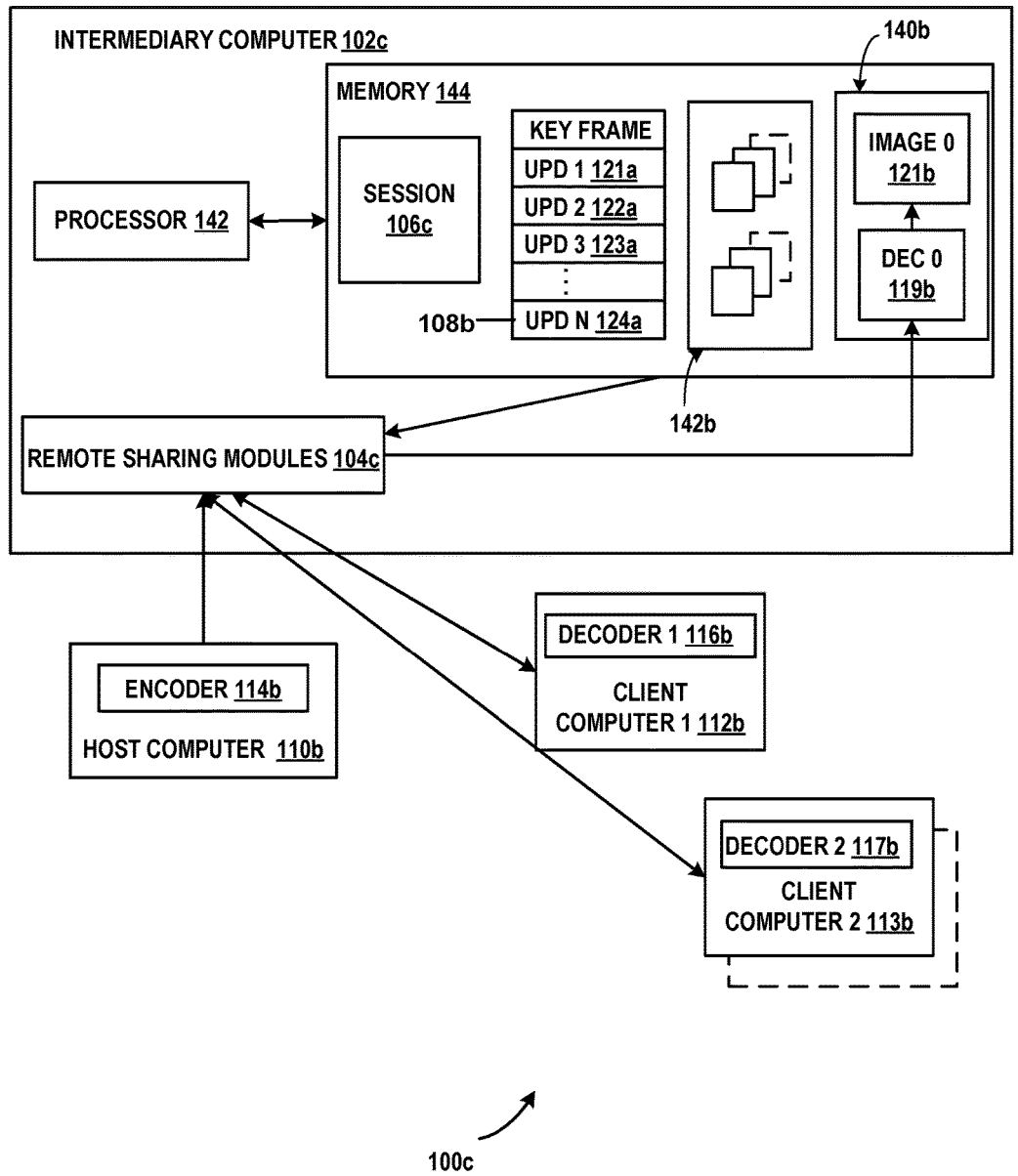
FIG. 1d illustrates an example of a system 100c that implements desktop screen sharing using a FIFO queue and double buffering in accordance with aspects of the subject matter disclosed herein.

FIG. 1*d* illustrates an example of a system 100*c* for desktop screen sharing using both a FIFO queue 108*b* as described with respect to FIG. 1*b* and double buffering as described with respect to FIG. 1*c* in accordance with aspects of the subject matter disclosed herein. The intermediary computer 102*c* may utilize a dynamic algorithm to switch between using the FIFO queue 108*b* and the double buffering approach using buffer 1 140*b* and buffer 2 142*b*. For example, triggered by some specified factor or combination of factors all the client computers can be switched from using the double buffers to using the FIFO queue, or vice versa. Alternatively, or additionally, one group of client computers can be assigned to the FIFO approach and another group of client computers can be assigned to the double buffering approach. For example, client computers that exceed a processing power threshold (e.g., client computer 2 113*b*) can be set to use the FIFO queue 108*b* and all other client computers (e.g., client computer 1 112*b*) can be set to use the double buffering approach. The performance of the overall system can be monitored and adjusted according to dynamic algorithmic techniques based on the amount of memory usage of the intermediary computer 102*c*, by the amount of cpu usage and so on.

Figure 2:
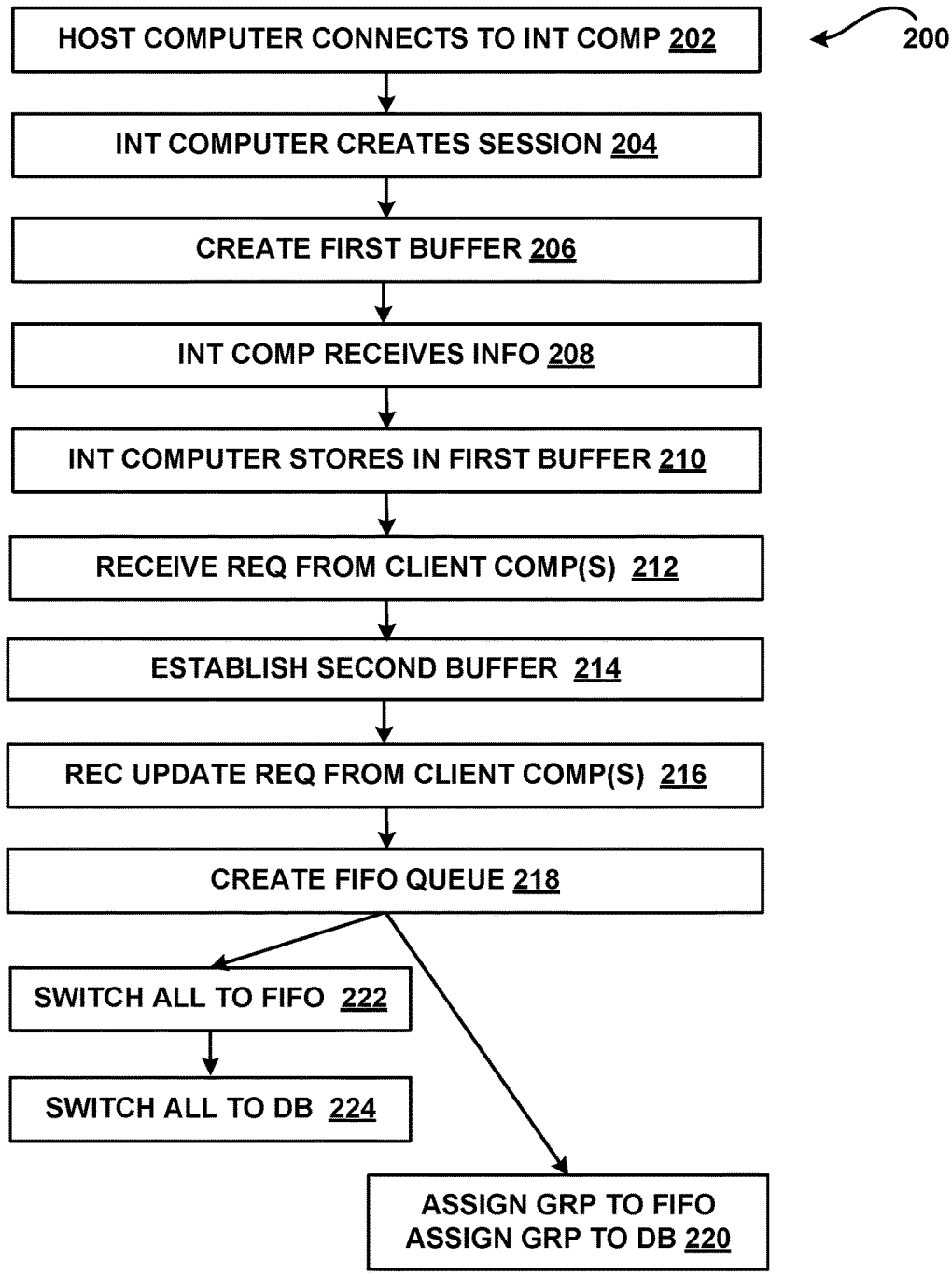
FIG. 2 is a flow diagram of an example of a method 200 for desktop screen sharing using double buffering in accordance with aspects of the subject matter disclosed herein.

FIG. 2 is an example of a method 200 for sharing a desktop screen using the double buffering approach described above or a combination of double buffering and a FIFO queue in accordance with aspects of the subject matter disclosed herein. FIG. 2 or portions thereof can describe systems as described with respect to FIGS. 1*a-d* above. The actions described below can occur in sequences other than those depicted by FIG. 2, as will be appreciated by those of skill in the art. Some of the actions depicted in FIG. 2 may be optional or may be omitted. At 202 an intermediary computer can receive a communication from a host computer requesting a screen sharing session. At 204 the intermediary computer can establish a screen sharing session for the host computer. The intermediary computer may generate a session-specific identifier for the session established for the host computer and may send the session-specific identifier to the host computer.

At 206 the intermediary computer can establish a first buffer for storing a decoder and for storing a copy of the most current screen image the intermediary computer has for the host computer. At 208, the intermediary computer can receive an encoded screen image, such as the initial key frame, a subsequent key frame or an encoded differential screen image update from the host computer. At 210 if the encoded screen information received by the intermediary computer represents a key frame, the intermediary computer can decode the key frame and store the decoded screen image in the first buffer. If the encoded screen information represents a differential screen image update, the intermediary computer can decode the differential screen image update and apply it to the stored decoded screen image in the first buffer.

At 212 a request to join the session can be received by the intermediary computer from one or more client computers. At 214 the intermediary computer can create an instance of an encoder for each client computer that joins the session. The intermediary computer can establish a second buffer to store the decoder and a screen image for each client computer that joins the session. At 216 in response to receiving a request for an update from a client computer, the intermediary computer can compare the latest screen image for the client computer stored in the second buffer and the screen image for the screen sharing session in the first buffer and can send an encoded differential screen image update to the client computer.

Optionally, at 218, triggered by some factor or factors or condition or conditions, a FIFO queue for storing encoded differential screen image updates can be created by the intermediary computer. At 220 a group of client computers can be assigned to perform screen sharing using the FIFO queue while another group of client computers can be set to perform screen sharing using double buffering, as described more fully above. Alternatively, at 222 triggered by some monitored condition or conditions, the mode for screen sharing for all client computers can be switched to FIFO mode and at 224, triggered by some monitored condition or conditions, the mode for screen sharing for all client computers can be switched back to double buffering mode. This process can continue until the screen sharing session is closed.

Example of a Suitable Computing Environment

Figure 3:
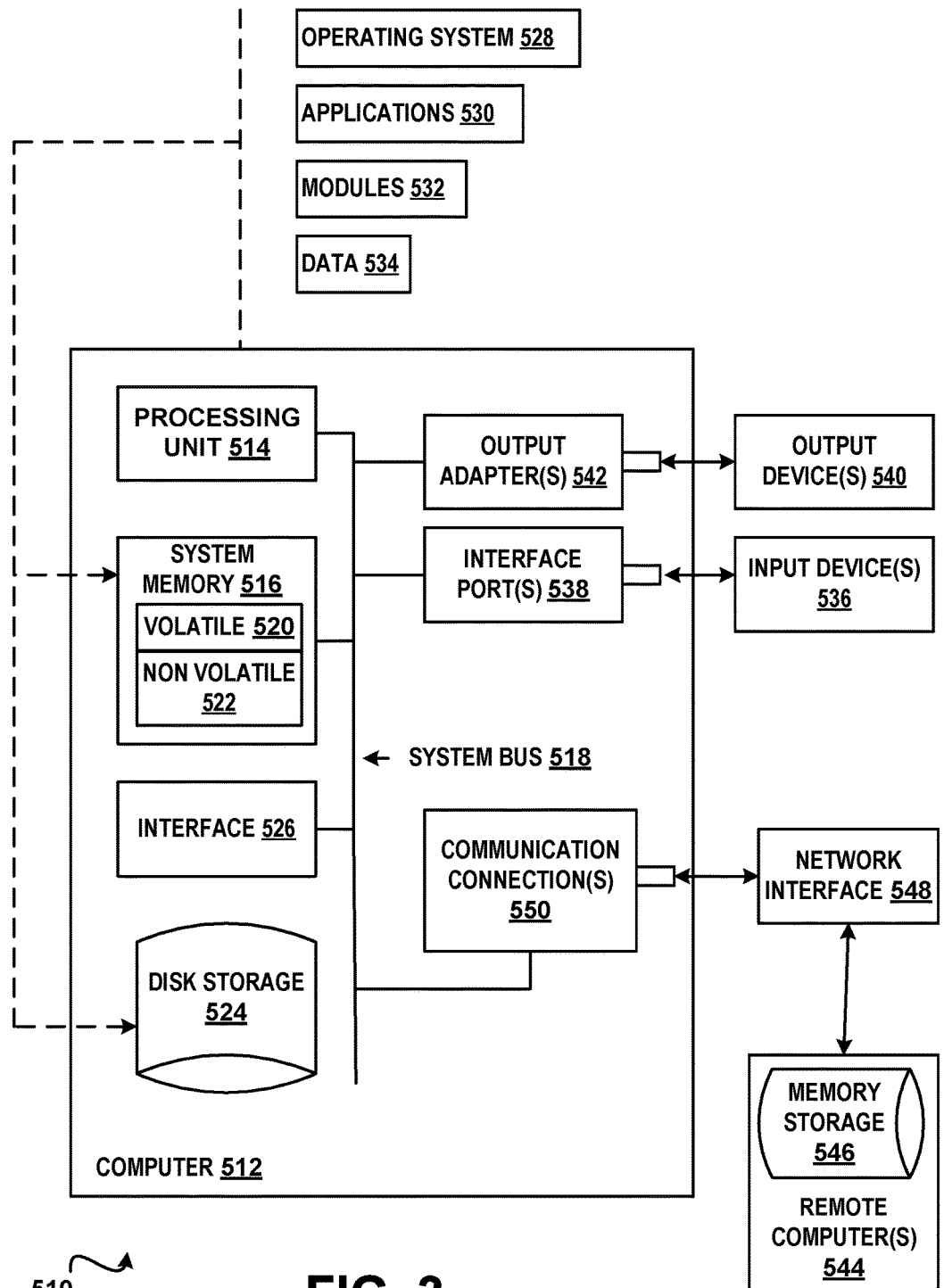
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A method of facilitating a network communication session between a first client computer and a second client computer using an intermediate computer, comprising:
   transmitting, from the intermediate computer, a version of the screen image of the first client computer to the second client computer;
   storing, on the intermediate computer, the transmitted version of the screen image as corresponding to the second client computer;
   subsequently,
      receiving, at the intermediate computer, one or more updates of differential screen image from the first client computer;

generating a current version of the screen image of the first client computer based on the received one or more updates; and encoding, at the intermediate computer, a differential screen image update between the current version of the screen image of the first client computer and the stored version corresponding to the second client computer; and transmitting the encoded differential screen image update to the second client computer, the differential screen image update comprising a difference between the current version of the screen image of the first client computer and the stored version of the screen image corresponding to the second client computer at the intermediate computer.

2. The method of claim 1 wherein generating a current version of the screen image of the first client computer includes sequentially applying the received one or more updates of differential screen image to a key frame image to generate the current version of the screen image of the first client computer.

3. The method of claim 1, further comprising subsequent to transmitting the encoded differential screen image update to the second client computer, updating, at the intermediate computer, the stored version corresponding to the second client computer with a version corresponding to the transmitted encoded differential screen image.

4. The method of claim 3, further comprising:
receiving, at the intermediate computer, additional updates of differential screen image from the first client computer;
in response to receiving the additional updates, generating an updated version of the screen image of the first client computer based on the received additional differential screen image updates; and
encoding another differential screen image update to the second client computer, the another differential screen image update including a difference between the updated version of the screen image of the first client computer and the stored updated version of the screen image corresponding to the second client computer.

5. The method of claim 1, further comprising:
receiving, at an intermediate computer, a key frame and one or more differential screen image updates from the first client computer; and
applying the received one or more differential screen image updates to the key frame to generate the version of screen image of first client computer at the intermediate computer.

6. The method of claim 5, further comprising switching between storing the one or more differential screen image updates received from the first client computer and storing the version of the screen image on the intermediate computer.

7. The method of claim 5 wherein applying the received one or more differential screen image updates is temporally independent from encoding the differential screen image update at the intermediate computer and transmitting the encoded differential screen image update to the second client computer.

8. A computing device for facilitating a network communication session between a host computer and a client computer via a computer network, comprising:
a processor; and
a memory containing instructions executable by the processor to cause the processor to perform a process comprising:

transmitting, via the computer network, a version of a screen image associated with the host computer to the client computer;
subsequent to transmitting the version of the screen image to the client computer, storing, in the memory, the transmitted version as a client version of the screen image corresponding to the client computer;
receiving multiple updates of screen image from the host computer;
generating another version of the screen image of the host computer based on the received one or more updates; and
encoding a differential screen image update between the another version of the screen image of the host computer and the stored client version corresponding to the client computer; and
transmitting, via the computer network, the encoded differential screen image update to the client computer and updating the client version stored in the memory with another client version corresponding to the transmitted differential screen image update.

9. The computing device of claim 8 wherein generating the another version of the screen image of the host computer includes sequentially applying the received one or more updates of screen image to a key frame image to generate the another version of the screen image of the host computer.

10. The computing device of claim 8, further comprising subsequent to transmitting the encoded differential screen image update to the client computer, updating, at the computing device, the stored version corresponding to the client computer with a version corresponding to the transmitted encoded differential screen image.

11. The computing device of claim 8 wherein the process performed by the processor further includes:
receiving, via the computer network, additional updates of screen image from the host computer;
in response to receiving the additional updates, generating an updated version of the screen image of the host computer based on the received additional screen image updates; and
encoding another differential screen image update corresponding to the client computer, the another differential screen image update including a difference between the updated version of the screen image of the host computer and the stored updated version of the screen image corresponding to the client computer.

12. The computing device of claim 8 wherein the process performed by the processor further includes:
receiving, via the computer network, a key frame and one or more differential screen image updates from the host computer; and
applying the received one or more differential screen image updates to the key frame to generate versions of screen image of host computer.

13. The computing device of claim 12 wherein the process performed by the processor further includes switching between storing the one or more differential screen image updates received from the host computer and storing the versions of the screen image on the computing device.

14. The computing device of claim 8 wherein applying the received one or more differential screen image updates is temporally independent from encoding the differential screen image update at the computing device and transmitting the encoded differential screen image update to the client computer.

15. A computing device for participating in a network communication session with a host computer via an intermediate computer over a computer network, comprising:
- a processor; and
- a memory and a display operatively coupled to the processor, the memory containing instructions executable by the processor to cause the processor to perform a process comprising:
  - receiving, from the intermediate computer, a version of a screen image associated with the host computer and outputting the received version of the screen image on the display; and
  - subsequent to displaying the version of the screen image,
    - receiving, via the computer network, a differential screen image update encoded by the intermediate computer, the received differential screen image update including a difference between a current version of the screen image of the host computer as currently existing at the intermediate computer and the outputted version of the screen image on the display;
    - applying the received differential screen image to the outputted version of the screen image to generate an updated version of the screen image of the host computer; and
    - outputting the updated version of the screen image on the display.

16. The computing device of claim 15, further comprising:
- transmitting, via the computer network, a request to join the network communication session with the host computer to the intermediate computer; and
- receiving, from the intermediate computer, the version of the screen image associated with the host computer, the received version of the screen image is a version of the screen image of the host computer as currently existing at the intermediate computer.

17. The computing device of claim 16 wherein the current version of the screen image of the host computer representing a version having multiple differential screen image updates of the host computer applied to a key frame image of the host computer.

18. The computing device of claim 15 wherein the received differential screen image update is encoded by the intermediate computer based on the current version of the screen image of the host computer and a stored version of the screen image corresponding to the initially received version of the screen image at the computing device.

19. The computing device of claim 15, further comprising:
- transmitting, via the computer network, a request for update to the intermediate computer; and
- receiving, via the computer network, another differential screen image update encoded by the intermediate computer, the another differential screen image update including a difference between an updated current version of the screen image of the host computer as currently existing at the intermediate computer and the outputted updated version of the screen image on the display.

20. The computing device of claim 15 wherein the current version of the screen image of the host computer is updated on the intermediate computer temporally independent from encoding the differential screen image update at the intermediate computer and transmitting the encoded differential screen image update to the client computer.

* * * * *